(12) United States Patent
Keam

(10) Patent No.: US 7,515,822 B2
(45) Date of Patent: Apr. 7, 2009

(54) IMAGING SYSTEMS' DIRECT ILLUMINATION LEVEL ADJUSTING METHOD AND SYSTEM INVOLVES ADJUSTING OPERATION OF IMAGE SENSOR OF IMAGING SYSTEM BASED ON DETECTED LEVEL OF AMBIENT ILLUMINATION

(75) Inventor: Nigel S. Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 277 days.

(21) Appl. No.: 11/433,875

(22) Filed: May 12, 2006

(65) Prior Publication Data
US 2007/0263999 A1    Nov. 15, 2007

(51) Int. Cl.
*G03B 15/03* (2006.01)

(52) U.S. Cl. .............. 396/159; 396/164; 348/362; 348/366

(58) Field of Classification Search ........ 396/155, 396/159, 161, 164; 348/162, 164, 229.1, 348/296, 362–366, 370, 371, 602–603; 250/330–334, 250/336.1, 338.1; 345/77
See application file for complete search history.

(56) References Cited

U.S. PATENT DOCUMENTS

| | | | |
|---|---|---|---|
| 4,088,400 A | 5/1978 | Assouline et al. | |
| 4,243,879 A | 1/1981 | Carroll et al. | |
| 5,589,905 A * | 12/1996 | McIntyre | 396/431 |
| 6,172,725 B1 | 1/2001 | Lengyel | |
| 6,650,340 B1 | 11/2003 | Georges et al. | |
| 6,812,466 B2 | 11/2004 | O'Connor et al. | |
| 6,947,017 B1 | 9/2005 | Gettemy | |
| 6,970,811 B1 | 11/2005 | Boerger et al. | |
| 2004/0051691 A1 | 3/2004 | Hedrick | |
| 2005/0035304 A1 | 2/2005 | Colvin, Jr. et al. | |
| 2005/0127278 A1 | 6/2005 | Cok | |
| 2005/0190142 A1 | 9/2005 | Ferguson | |
| 2005/0195596 A1 | 9/2005 | Van Brocklin et al. | |
| 2005/0212824 A1 | 9/2005 | Marcinkiewicz et al. | |
| 2005/0253835 A1 | 11/2005 | Kawase | |

(Continued)

FOREIGN PATENT DOCUMENTS

GB      2202624      9/1988

(Continued)

OTHER PUBLICATIONS

Tradennick, Nick, et al., "The vision for microvision", http://www.gildertech.com/public/SampleIssues/GTROctober05.pdf.

(Continued)

*Primary Examiner*—Jay M Patidar
(74) *Attorney, Agent, or Firm*—Richard C. Irving

(57) ABSTRACT

In one embodiment, a level of direct illumination for an imaging system is dynamically adjusted based on a level of at least one of ambient illumination or displayed illumination. A level of the at least one of ambient illumination or displayed illumination may be detected. The level of direct illumination may be altered based on the detected level of the at least one of ambient illumination or displayed illumination. Operation of a non-visible light-sensitive image sensor of the imaging system may be adjusted based on the altered level of direct illumination.

20 Claims, 6 Drawing Sheets

U.S. PATENT DOCUMENTS

2005/0286131 A1   12/2005  Saxena et al.
2006/0038901 A1   2/2006  Tapes et al.

FOREIGN PATENT DOCUMENTS

GB    2202624 A  *  9/1988
WO    WO 00/57638  *  9/2000
WO    WO0057638    9/2000

OTHER PUBLICATIONS

Devlin, Adela Katharina, "Perceptual fidelity for digital image display", http://www.cs.bris.ac.uk/Publications/Papers/2000103.pdf.

Anderson, Paul, "JISC: Advanced Display Technologies" http://www.jisc.ac.uk/uploaded_documents/jisctsw_05_03.doc.

* cited by examiner

IMAGING SYSTEMS' DIRECT ILLUMINATION LEVEL ADJUSTING METHOD AND SYSTEM INVOLVES ADJUSTING OPERATION OF IMAGE SENSOR OF IMAGING SYSTEM BASED ON DETECTED LEVEL OF AMBIENT ILLUMINATION

BACKGROUND

An imaging system may include an interactive display surface, which may be a surface for displaying computer generated output and receiving interactive input from a user manipulating one or more objects on or above the interactive display surface. Such an imaging system may be directly illuminated with light such that a camera may capture an image of the interactive display surface and the one or more objects on or above the interactive display surface. Bright ambient light may cause an image to appear washed out to the camera unless a level of direct illumination is increased to offset an effect of the bright ambient light.

One possible solution to this problem is to have the interactive display surface illuminated by a constant bright level of direct illumination. However, a drawback to this approach is that the imaging system will use more power to keep the direct illumination operating at a high level. Further, a constant bright level of illumination may result in a higher level of heat generated by a light source, such as one or more light bulbs or light emitting diodes (LEDs). In addition, the light source may have a shorter life expectancy when always operated at a bright setting.

In imaging systems that respond to visible light, the visible light projected by the systems to produce images may be partially reflected back by the interactive display surface, thereby leading to false readings. Even if such reflections could be suppressed, unless the imaging systems were disposed in a dark room, room light and other visible light passing through the interactive display surface would adversely affect such imaging systems. Furthermore, such imaging system could not produce dark or dim screens because there either would not be sufficient visible light to detect objects and movements, or the light used to detect objects and movement would eclipse the dark or dim images intended for the user to see. The use of non-visible light, such as, for example, ultraviolet (UV) light or infrared (IR) light, to detect objects placed on an interactive display surface can avoid some of the problems that would arise from attempting to recognize objects with visible light.

In an imaging system that uses non-visible light, such as infrared or ultraviolet light, to directly illuminate an interactive display surface for a camera that is sensitive to the non-visible light, a constant high level of direct illumination for overcoming a possible high level of non-visible ambient light may be detrimental to eye safety in addition to the problems mentioned above.

Human eyes respond to visible wavelengths of light. When visible light is bright, a pupil of the human eye will contract and permit less light to enter the eye. When visible light is dim, the pupil of the human eye will dilate and permit more light to enter the eye. However, if a level of visible light is dim and a level of non-visible light is bright, the pupil of the human eye will dilate to permit more visible light as well as more harmful non-visible light to enter the eye.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to dynamically adjusting a level of direct illumination for an imaging system based on at least one of a level of ambient illumination or display illumination. The level of the at least one of ambient illumination or display illumination may be detected. The level of direct illumination may be altered based on the detected level of the at least one of ambient illumination or display illumination. Operation of a non-visible light-sensitive image sensor of the imaging system may be adjusted based on the altered level of direct illumination.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings in which.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Exemplary Imaging System

Figure 1:
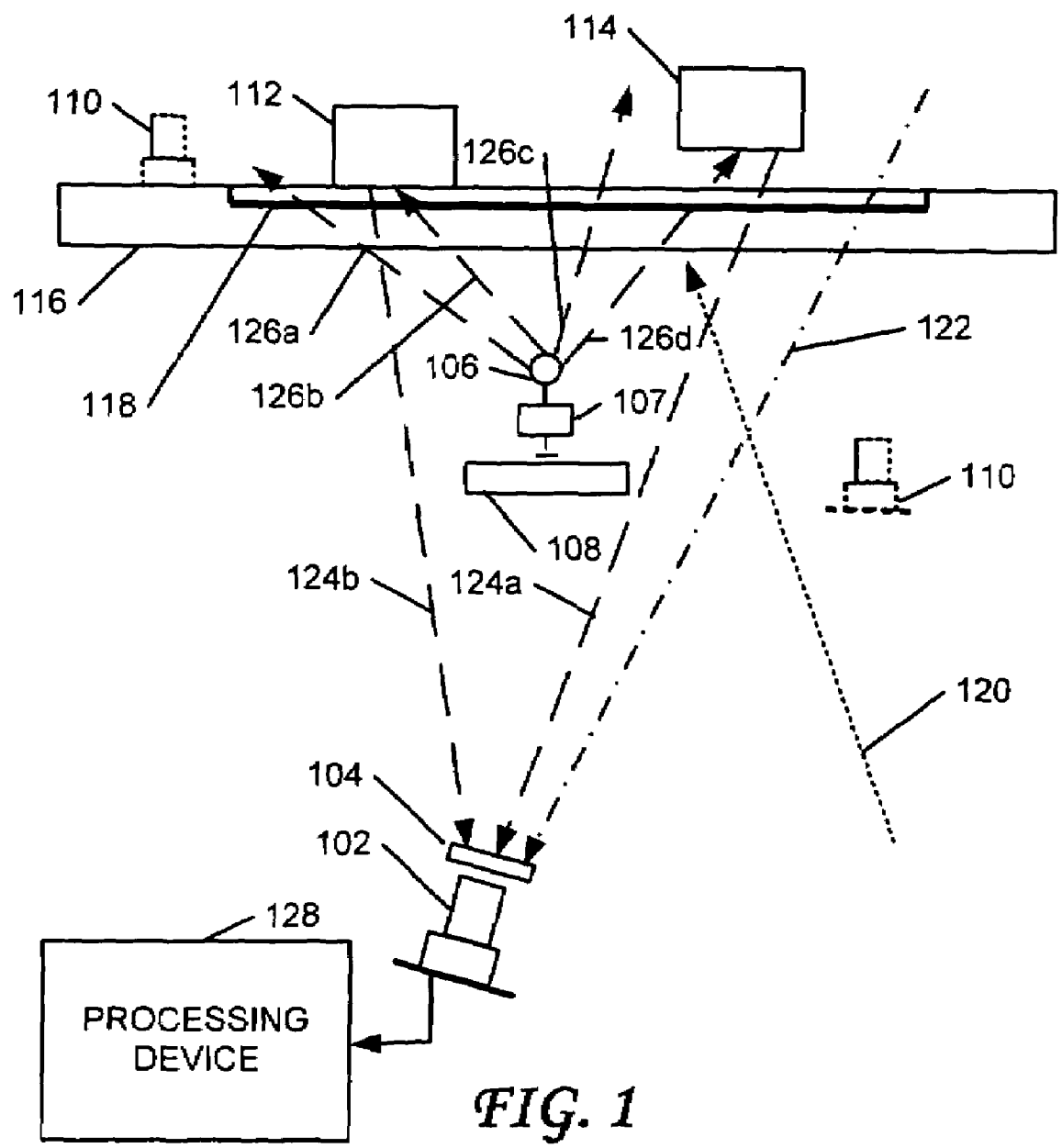
FIG. 1 is a cross sectional view of a portion of an exemplary interactive imaging system, illustrating internal components.

With reference to FIG. 1, an exemplary imaging system 100 suitable for implementing various embodiments is shown. System 100 may include an image sensor 102, a bandpass filter 104, a light source 106, a light source controller 107, a baffle 108, one or more light sensors 110, an interactive display table 116, a display layer 118 of the interactive display table 116, and a processing device 128. Also shown are a touch object 112 and a hover object 114. Light source 106, light source controller 107 and image sensor 102 together comprise what is referred to herein as a dynamic illumination system.

Exemplary imaging system 100 may provide an image on display layer 118 by, for example, projecting a processing device-generated image onto display layer 118 from a projector connected to a processing device, forming an image on a liquid crystal display (LCD) included in display layer 118, or other methods. A user may move one or more touch objects 112 or hover objects 114 above or on a surface of interactive display table 116 over display layer 118. Image sensor 102 may detect the one or more touch objects 112 or the one or more hover objects 114 near or in contact with the surface of interactive display table 116 over display layer 118. Image sensor 102 may pass an image of the detected one or more touch objects 112 or the detected one or more hover objects 114 to processing device 128, which may cause an image on display layer 118 to change accordingly. A level of direct lighting by light source 106 may be changed by light source controller 107 based on a level of ambient illumination detected by image sensor 102 or light sensor(s) 110. Alternatively, the level of direct lighting by light source 106 may be changed by light source controller 107 based on a level of displayed illumination detected by light sensor(s) 110.

Image sensor 102 may be mounted to a frame (not shown) or other structure below display layer 118 of the interactive display table 116. Generally, image sensor 102 may be any digital camera that is operable to obtain digital video images. In one implementation, image sensor 102 may be disposed to receive reflected non-visible light from touch object 112 or hover object 114. Bandpass filter 104 may be a transparent or translucent optical element that may be positioned to filter light entering image sensor 102, such that only non-visible light, for example, ultraviolet or infrared light, may enter image sensor 102.

Light source 106 may be mounted to the frame (not shown) or other structure and may include one or more LEDs or other light source that may emit non-visible light, such as, for example, infrared or ultraviolet light. The non-visible light may be directed upward toward display layer 118.

Baffle 108 may be disposed between light source 106 and image sensor 102 to prevent light directly emitted from light source 106 from entering image sensor 102.

One or more light sensor(s) 110 may be disposed in positions such that light sensor(s) 110 may detect a level of ambient light, such as, for example, non-visible light. In some embodiments, light sensor(s) 110 may detect a level of light of a same wavelength of light to be detected by image sensor 102. In other embodiments, light sensor(s) may detect light of a different wavelength than light to be detected by image sensor 102, such as, for example, visible light or non-visible light of a frequency different from the non-visible light detected by image sensor 102.

Light sensor(s) 110 may be mounted to the frame (not shown) or other structure under interactive display table 116 and disposed such that light may directly enter light sensor(s) 110 while direct light from light source 106 may not enter light sensor(s) 110. In such an embodiment, light from light source 106 may not interfere with operation of light sensor(s) 110. In an embodiment in which light sensor(s) 110 may receive direct light from light source 106, light from light source 106 may be extinguished when light sensor(s) 110 is being used to detect a level of ambient light. In another embodiment, light sensor(s) 110 may be mounted on a top surface of interactive display table 116, such that ambient light may directly enter light sensor(s) 110 while direct light from light source 106 may not enter light sensor(s) 110. This is an example of another embodiment in which light from light source 106 may not interfere with operation of light sensor(s) 110.

Non-visible light from light source 106 may be reflected from any objects that are atop (for example, touch object 112) or proximate to display layer 118 (for example, hover object 114) after passing through display layer 118, which may include a translucent layer comprising a sheet of vellum or other suitable translucent material with light diffusing properties. As a result of using the translucent layer to diffuse the non-visible light passing through display layer 118, as an object approaches the top of display layer 118, the amount of the non-visible light that is reflected by the object increases to a maximum level that is achieved when the object is actually in contact with the top of interactive display table 116 over display layer 118.

In another embodiment, display layer 118 may include a liquid crystal display (LCD) or other display device. In such an embodiment, non-visible light, such as, for example, infrared light, can pass through an LCD panel regardless of a display state of the LCD, such that image sensor 102 may detect one or more objects on or close to the top of interactive display table 116 over display layer 118. An embodiment that includes an LCD in display layer 118 does not require a projector to project processing device-generated images onto display layer 118.

Although only one light source 106 and light source controller 107 are shown, it will be appreciated that multiple light sources 106 and light source controllers 107 may be mounted at spaced-apart locations around the interior sides of the frame (not shown) to provide an even illumination of display layer 118. Further, multiple image sensors 102 may be mounted at spaced-apart locations around the interior sides of the frame (not shown). The non-visible light produced by light source 106 may:

exit through the table surface without illuminating any objects, as indicated by dashed lines 126a and 126c;

illuminate objects on the table surface, as indicated by dashed line 126b; or illuminate objects a short distance above the table surface but not touching the table surface, as indicated by dashed line 126d.

Objects above display layer 118 may include one or more touch objects 112 that rest atop a surface of interactive display table 116 over display layer 118 and one or more hover objects 114 that are close to, but not in actual contact with, the surface of interactive display table 116 over display layer 118. Dashed lines 124a and 124b illustrate non-visible light reflected from hover object 114 and touch object 112, respectively, passing through bandpass filter 104 and entering image sensor 102.

In some embodiments, a projector (not shown) may project light directly or indirectly onto display layer 118. A dashed line 120 shows direct or reflected light from the projector (not shown) being directed to display layer 118. Reflected light originating from the projector may be reflected from a mirror (not shown). An embodiment that includes an LCD in display layer 118 may not include a projector.

Image sensor 102 may pass image signals to processing device 128, which may include a personal computer or other processing device. Processing device 128 may be linked to image sensor 102 to receive image signals via a wired or wireless connection. In embodiments that include a projector, processing device 128 may send signals to the projector to control displaying of images on display layer 118.

Although FIG. 1 shows two light sensors 110 in exemplary system 100, system 100 may have no light sensors 110, one light sensor 110, or many light sensors 110 at multiple spaced-apart locations disposed either below interactive display table 116 or above interactive display table 116.

Exemplary Processing Device

Figure 2:
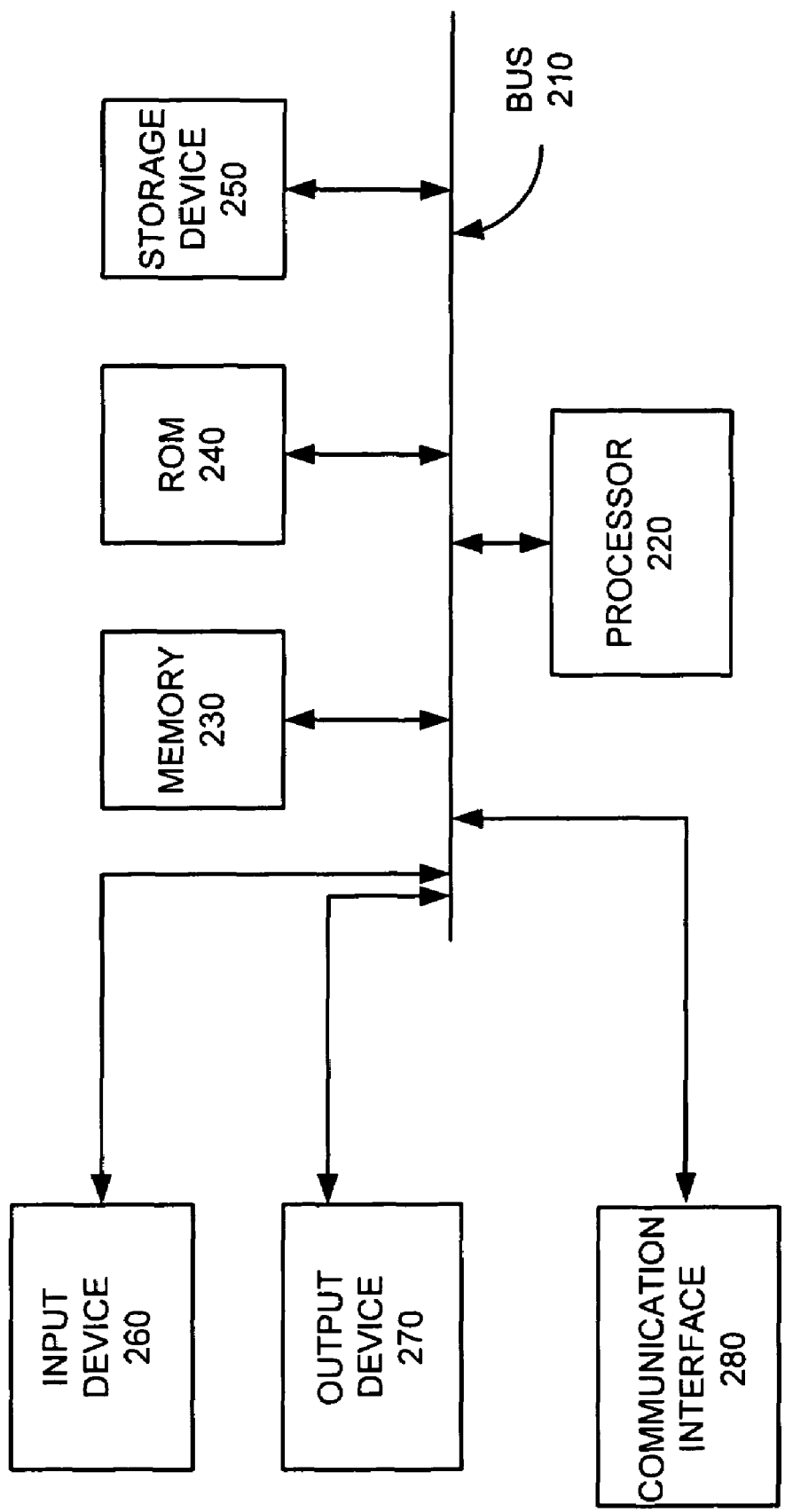
FIG. 2 illustrates a functional block diagram of a processing device that may be used with the interactive imaging system of FIG. 1.

FIG. 2 illustrates a functional block diagram of exemplary processing device 128 that may be used in various embodiments. Processing device 128 may include a bus 210, a processor 220, a memory 230, a read only memory (ROM) 240, a storage device 250, an input device 260, an output device 270, and a communication interface 280. Bus 210 may permit communication among the components of processing device 128.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to processing device 128, such as a keyboard, a mouse, a pen, a voice recognition device, a microphone, a headset, etc. Output device 270 may include one or more conventional mechanisms that output information to the user, including a display, a printer, one or more speakers, a headset, or a medium, such as a memory, or a magnetic or optical disk and a corresponding disk drive. Communication interface 280 may include any transceiver-like mechanism that enables processing device 100 to communicate with other devices or networks. In one embodiment, communication interface 280 may include an interface to image sensor 102. The interface may be a wireless, wired or optical interface. In one embodiment, the interface may include a universal serial bus (USB) interface.

Processing device 128 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

First Exemplary Embodiment

Figure 3:
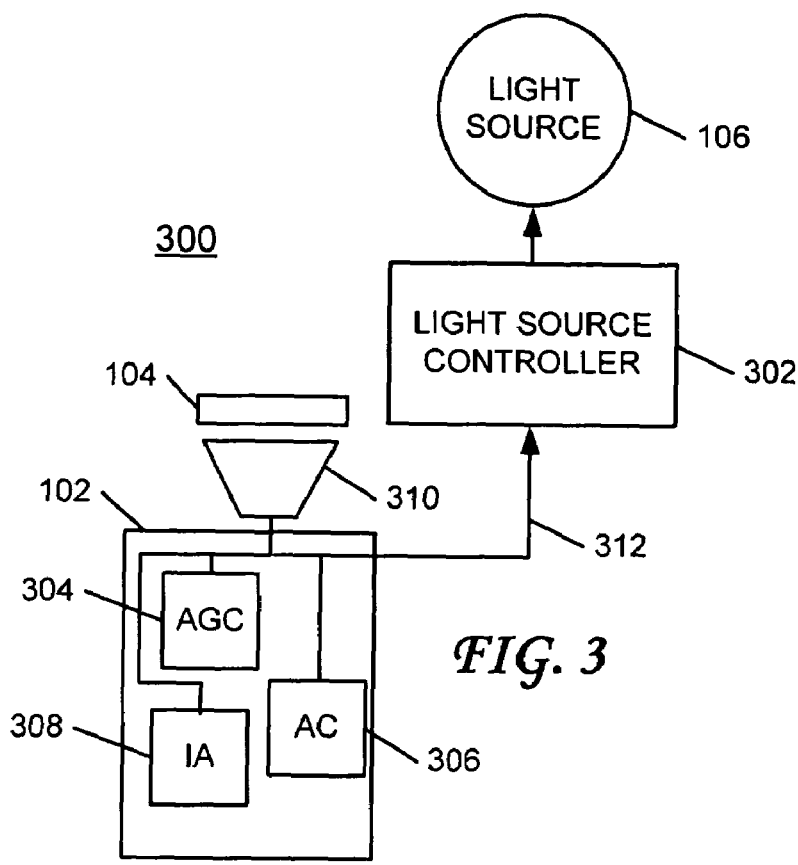
FIG. 3 illustrates a functional block diagram of an exemplary dynamic illumination system.

FIG. 3 illustrates a functional block diagram of one embodiment 300 of exemplary dynamic illumination system. Embodiment 300 may include light source 106, light source controller 302, and image sensor 102.

Image sensor 102 may include bandpass filter 104, sensor 310, automatic gain control (AGC) 304, aperture control (AC) 306, and image amplification module (IA) 308. Bandpass filter 104 may filter out all but non-visible wavelengths of light, such as, for example, infrared or ultraviolet light. Light, such as ultraviolet or infrared light, passing through bandpass filter 104 may be detected by sensor 310.

AGC 310 may alter a gain of sensor 310, such that signals from sensor 310, which represent detected light, may be amplified or diminished based on a level of light detected by sensor 310. That is, if a high level of light is detected by sensor 310, AGC 304 may diminish the gain of sensor 310. If a low level of light is detected by sensor 310, AGC 304 may increase the gain of sensor 310.

Similarly, AC 306 may adjust an aperture setting for an aperture (not shown) of image sensor 102 based on a level of light detected by sensor 310. For example, when sensor 310 detects a high level of light, AC 306 may decrease the aperture setting. When sensor 310 detects a low level of light, AC 306 may increase the aperture setting.

When processing an image in an imaging system, generally pixel levels may be compared to a threshold value, such that, for example, a pixel having a value lower than the threshold value may be treated as having a zero value. Use of such threshold levels may be used to help eliminate artifacts that may appear in an image. IA 308 may alter processing of an image received by image sensor 102. For example, if a low level of light is detected by sensor 310, IA 308 may decrease a threshold level to which each pixel is compared. On the other hand, if a high level of light is detected by sensor 310, IA 308 may increase a threshold level to which each pixel is compared. In some embodiments, IA 308 may change the threshold level to which each pixel is compared based on signals from AGC 304, or AC 306, in addition to signals from sensor 310. Integration time is an electronic equivalent of exposure time. In some embodiments, in addition to, or instead of changing the threshold level to which each pixel is compared, IA 308 may lengthen the integration time of image sensor 102.

A signal 312 indicating a level of light detected by sensor 310, such as, for example, a level of infrared or ultraviolet light, may be sent, via wired or wireless communication means, to light source controller 302, which may adjust a light level of light source 106. For example, image sensor 102 may detect a level of light, such as non-visible ambient light and may send signal 312 to light source controller 302 to change a level of light emitted from light source 106 to overcome a level of ambient lighting.

Some implementations of image sensor 102 may include each of AGC 304, AC 306 and IA 308, only one of AGC 304, AC 306 and IA 308, or a combination of any two of AGC 304, AC 306 and IA 308.

Although FIG. 3 shows only one light source 106, one light source controller 302 and one image sensor 102, it is contemplated that embodiments may include multiple light sources 106, light source controllers 302 and image sensors 102.

Second Exemplary Embodiment

Figure 4:
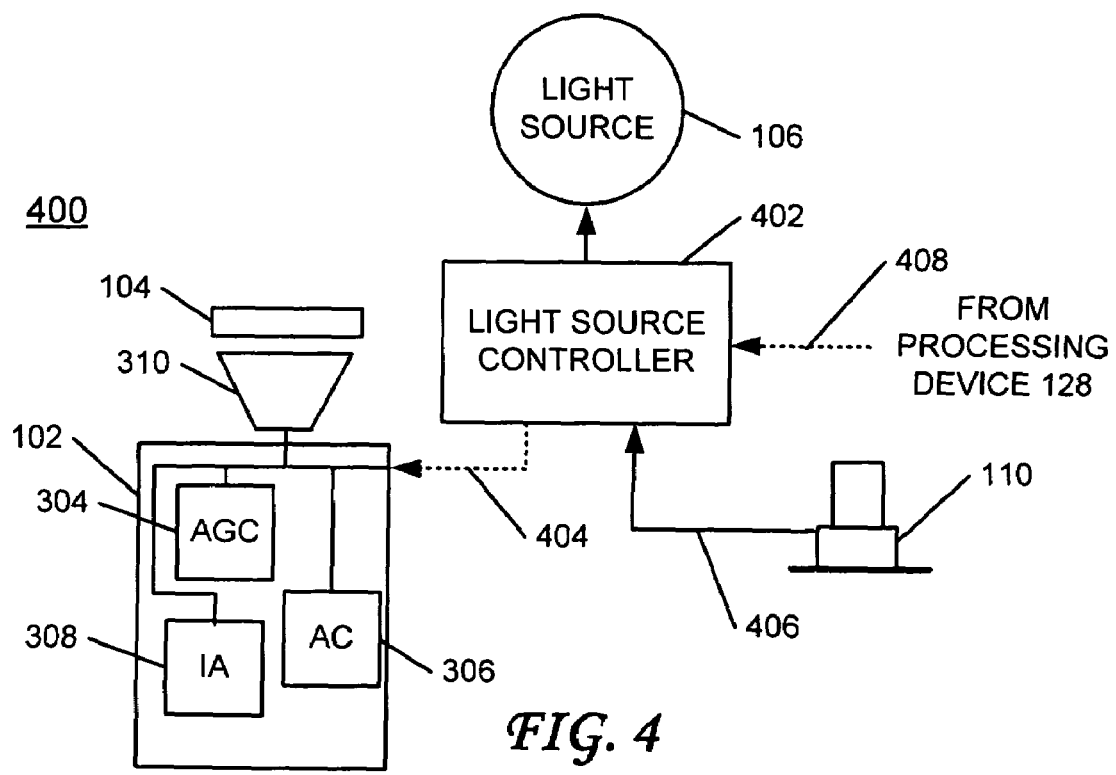
FIG. 4 illustrates a functional block diagram of a second exemplary dynamic illumination system.

FIG. 4 illustrates a functional block diagram of a second embodiment 400 of a dynamic illumination system. Embodiment 400 may include light source 106, light source controller 402, image sensor 102, and light sensor 110.

Image sensor 102 may include bandpass filter 104, sensor 310, automatic gain control (AGC) 304, aperture control (AC) 306, and image amplification module (IA) 308. Bandpass filter 104 may filter out all but non-visible wavelengths of light, such as, for example, infrared or ultraviolet light. Light, such as ultraviolet or infrared light, passing through bandpass filter 104 may be detected by sensor 310.

AGC 310 may alter a gain of sensor 104, such that signals from sensor 104, which represent detected light, may be amplified or diminished based on a level of light detected by sensor 310 or based on signals 404 from light source controller 402, which may indicate a level of illumination from light source 106. That is, if a high level of light is detected by sensor 310, or is indicated by signals 404, AGC 304 may diminish the gain of sensor 310. If a low level of light is detected by sensor 310 or is indicated by signals 404, AGC 304 may increase the gain of sensor 310.

Similarly, AC 306 may adjust an aperture setting for an aperture of image sensor 102 based on a level of light detected by sensor 310 or based on a level of light indicated by signals 404 from light source controller 402. For example, when sensor 310 detects a high level of light, AC 306 may decrease the aperture setting. When sensor 310 detects a low level of light or signals 404 indicate a low level of light, AC 306 may increase the aperture setting. In some embodiments, AC 306 may adjust the aperture setting based on either a level of light detected by sensor 310 or a level of light indicated by signals 404 and a signal from AGC 304 indicating an amount of gain for sensor 310.

IA 308 may alter processing of an image received by image sensor 102. For example, if a low level of light is detected by sensor 310 or is indicated by signals 404, IA 308 may decrease a threshold level to which each pixel is compared. On the other hand, if a high level of light is detected by sensor 310 or is indicated by signals 404, IA 308 may increase a threshold level to which each pixel is compared. In some embodiments, IA 308 may change the threshold level to which each pixel is compared based on signals from AGC 304, or AC 306, in addition to signals from sensor 310 or signals 404. In some embodiments, in addition to, or instead of changing the threshold level to which each pixel is compared, IA 308 may lengthen an integration time of image sensor 102.

Light sensor 110 may detect light in a same frequency range as light detected by image sensor 102, such as, for example, infrared or ultraviolet light. In some embodiments, light sensor 110 may detect other frequencies of light, such as, for example, visible light, or non-visible light in a frequency different from that detected by image sensor 102. Light sensor 110 may be arranged to detect visible light from display layer 118 or may be arranged to detect only non-visible ambient light. Light sensor 110 may provide signals 406 to light source controller 402 to indicate a level of light detected by light sensor 110. In response to receiving signals 406, light source controller 402 may adjust a level of direct illumination from light source 106. For example, if signals 406 indicate a high level of illumination, then light source controller 402 may increase a level of direct illumination from light source 106. If signals 406 indicate a low level of illumination, then light source controller 402 may decrease a level of direct illumination from light source 106. In some implementations, signals 406 may indicate to light source controller 406 that light sensor 110 is measuring light levels and that light source controller 404 should extinguish illumination from light source 106 until signals 406 indicate that light sensor 110 has completed the measurements. In some implementations, light source controller 402 may provide signals 404 to image sensor 102 to indicate a level of direct illumination.

In an alternative embodiment, instead of light sensor 110 providing signals 406 to light source controller 402, processing device 128 may provide signals 408 to light source controller 402 indicating an average level of brightness from a displayed image. Processing device 128 may provide this information to light source controller 402 because processing device 128 may control displayed images and may have information concerning a brightness level of the displayed images.

Some implementations of image sensor 102 in embodiment 400 may include each of AGC 304, AC 306 and IA 308, only one of AGC 304, AC 306 or IA 308, or a combination of any two of AGC 304, AC 306 and IA 308.

Although FIG. 4 shows only one light source 106, one light source controller 302, one image sensor 102 and one light sensor 110, it is contemplated that embodiments may include multiple light sources 106, light source controllers 302, image sensors 102 and light sensors 110.

Exemplary Operation

Figure 5:
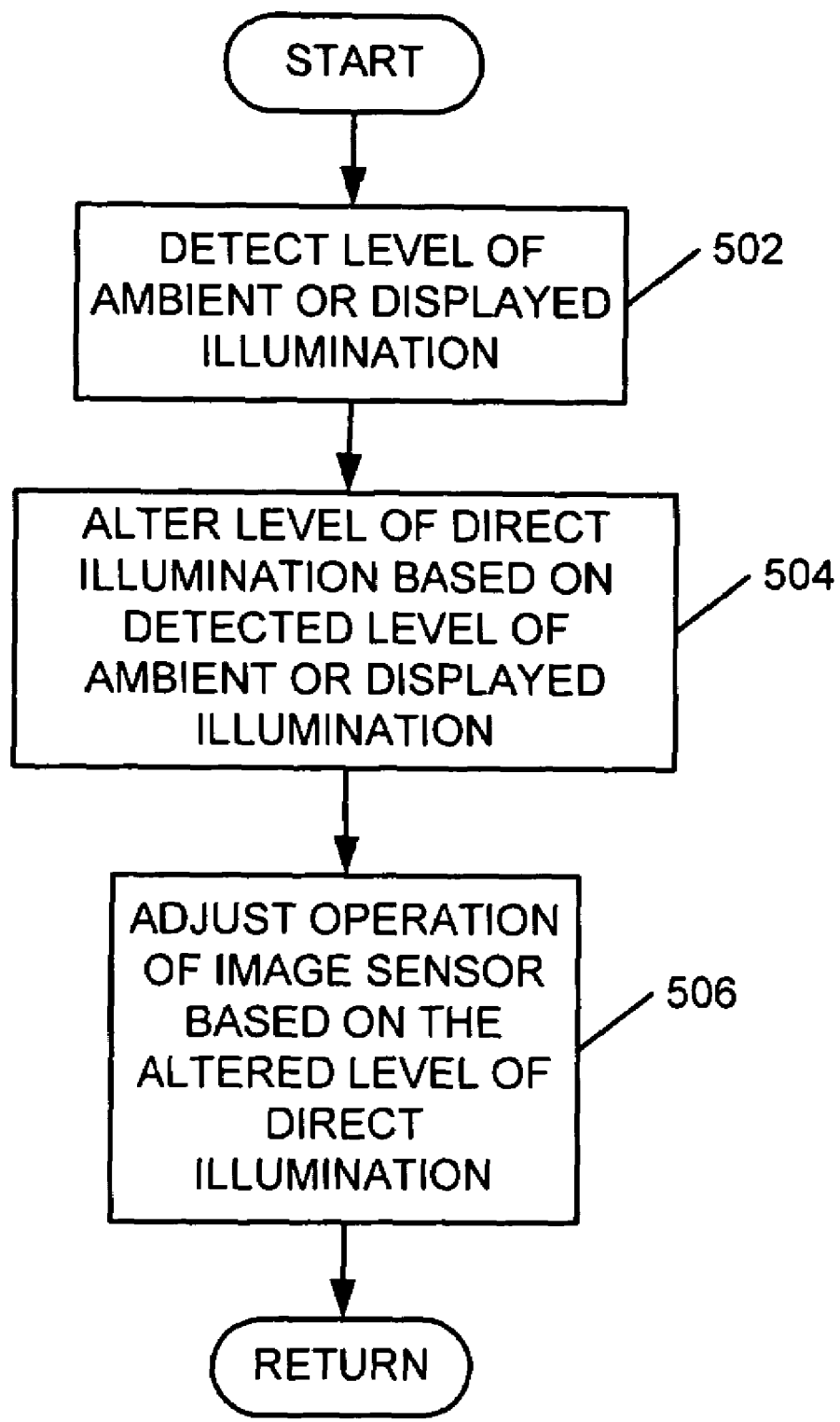
FIGS. 5-7 are flowcharts that illustrate operation of exemplary embodiments consistent with subject matter of this disclosure.
Figure 6:
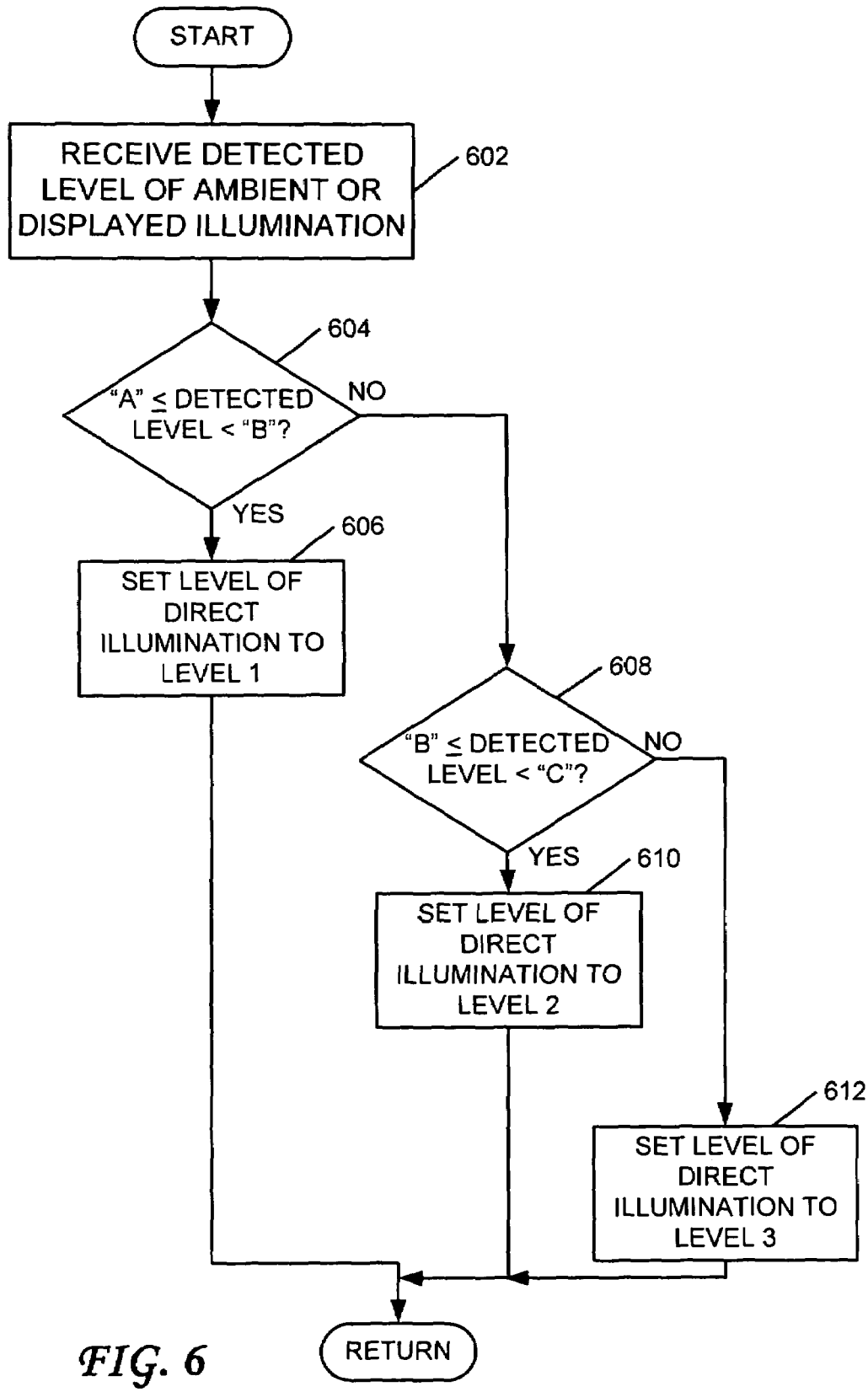
Figure 7:
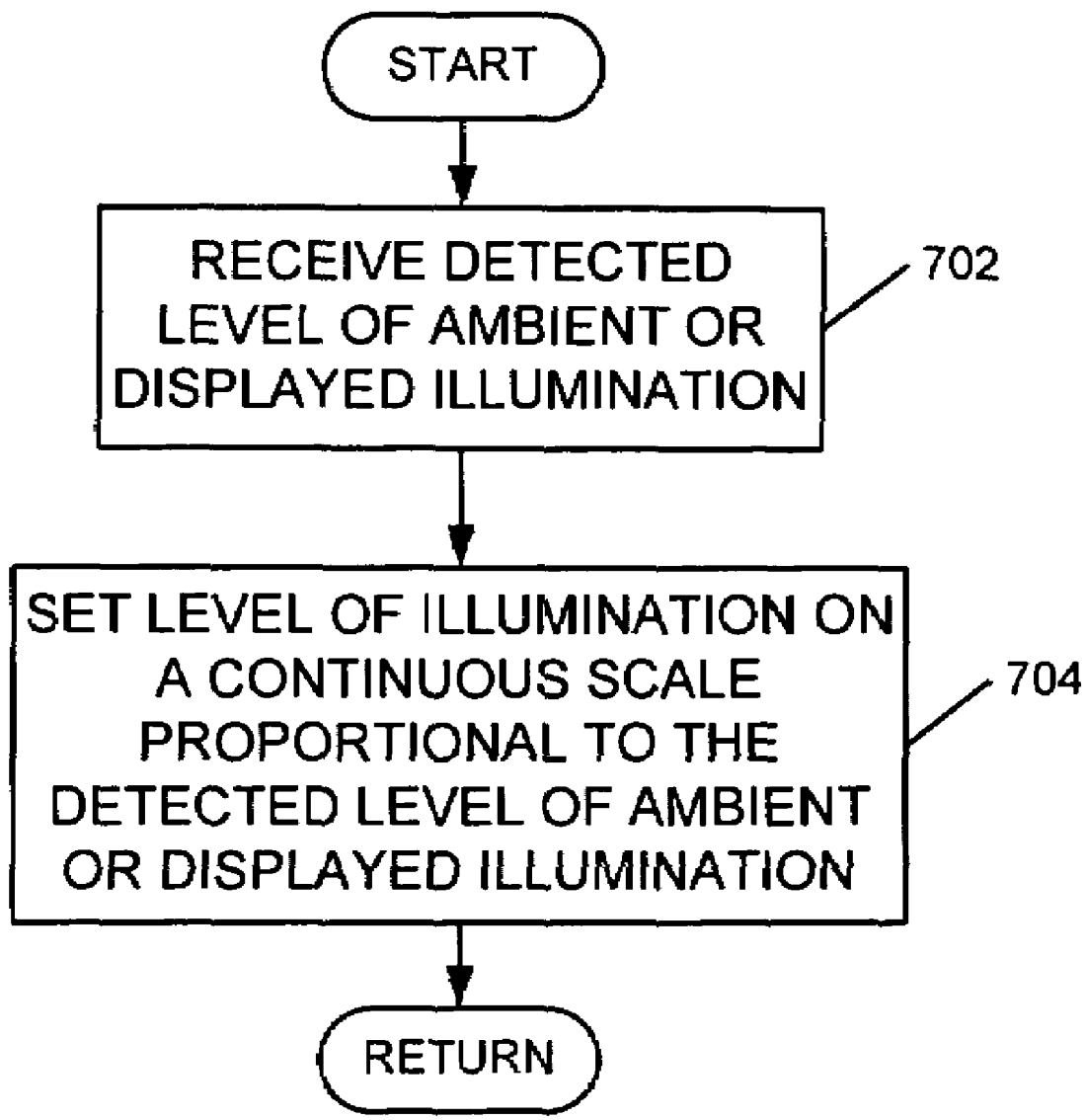

FIGS. 5-7 are flowcharts that illustrate exemplary operation of embodiments consistent with subject matter of this disclosure. First, a level of ambient or displayed illumination may be detected (act 502; FIG. 5). The illumination may be non-visible illumination, such as, for example, infrared or ultraviolet light and the illumination level may be detected by image sensor 102 and/or light sensor 110. Alternatively, a displayed illumination level may be determined by processing device 128 and provided to light source controller 402 via signals 408. In some implementations, light sensor 110 may detect a same frequency of light as that detected by image sensor 102, such as, for example, ambient non-visible ultraviolet or infrared light. In other implementations, light sensor 110 may detect frequencies different from those detected by image sensor 102, such as, for example, visible light from display layer 118 or non-visible ambient light of a frequency different than that detected by image sensor 102. In embodiments, such as, for example, system 300, image sensor 102 may provide signals 312 to light source controller 302 indicating a level of ambient non-visible light detected. In other embodiments, such as, for example, system 400, light sensor 110 may provide signals 406 to light source controller 402 indicating a level of non-visible ambient light detected, or a level of visible light detected from display layer 118.

Next, in response to receiving signals 312 or 406, light source controller 302 or 402 may alter a level of direct illumination from light source 106 based on the level of illumination detected (act 504). For example, light source controller 302 or 402 may respond to signals 312, 406, or 408 indicating a high level of illumination, by increasing a level of direct illumination from light source 106. Light source controller 302 or 402 may respond to signals 312, 406, or 408 indicating a low level of illumination, by decreasing a level of direct illumination from light source 106.

Next, image sensor 102 may adjust its operation based on the altered level of direct illumination (act 506). That is, image sensor 102 may detect the altered level of direct illumination and may alter its operation. The operation may be altered in a number of different ways. For example, in one implementation, sensor 310 may detect a level of direct illumination of non-visible light and may send a signal to AGC 304, which may adjust a gain of sensor 310. AGC 301 may decrease a gain of sensor 310 when AGC 304 receives a signal indicating a high level of illumination. AGC 304 may increase the gain of sensor 310 when AGC 304 receives a signal indicating a low level of illumination. In another implementation AC 306 may open an aperture of image sensor 102 when a signal from sensor 310 indicates a low level of illumination and may at least partially close the aperture when the signal indicates a high level of illumination. In yet another implementation, IA 308 may change a threshold level to which each pixel is compared during processing. The threshold level may be lower when the detected level of illumination is low and higher when the detected level of illumination is high. In other implementations, a combination of techniques may be used to alter the operation of image sensor 102 based on a combination of two or more of the above-mentioned methods. For example, AGC 304 and may alter the gain of sensor 310 and AC 306 may alter a size of an opening of the aperture, or AGC 304 and may alter the gain of sensor 310 and IA 308 may alter the threshold level to which pixels are compared, or AC 306 may alter a size of an opening of the aperture and IA 308 may change a threshold level to which each pixel is compared during processing, etc.

In other implementations, instead of altering operation of image sensor 102 based on a signal from sensor 310, operation of image sensor 102 may be altered based on signal 404 received from light source controller 402.

FIG. 6 is a flowchart that illustrates an implementation of act 504 in an embodiment consistent with the subject matter of this disclosure. Light source controller 302, 402 may receive the level of detected ambient or displayed illumination from image sensor 102, light sensor 110, or processing device 128 (act 602). Light source controller 302, 402 may then determine whether the detected level of ambient or displayed illumination falls between a level "A" and "B", such that the level "A" is less than or equal to the detected level of ambient or displayed illumination, which is less than the level "B" (act 604). If the level "A" is less than or equal to the detected level of ambient or displayed illumination, which is less than the level "B", then light source controller 302, 402 may cause light source 106 to emit a low level of illumination, for example, level 1 (act 606).

If, at act 604, light source controller 302, 402 determines that the detected level of ambient or displayed illumination in not a level between "A" and "B", then light source controller 302, 402 may determine whether the detected level of ambient or displayed illumination falls between a level "B" and "C", such that the level "B" is less than or equal to the detected level of ambient or displayed illumination, which is less that the level "C" (act 608). If the level "B" is less than or equal to the detected level of ambient or displayed illumination, which is less than the level "C", then light source controller 302, 402 may cause light source 106 to emit a medium level of illumination, for example, level 2 (act 610).

If, at act 608, light source controller 302, 402 determines that the detected level of ambient or displayed illumination in not a level between "B" and "C", then light source controller 302, 402 may assume that the detected level of ambient or displayed illumination is greater than or equal to the level "C" and light source controller 302, 402 may cause light source 106 to emit a high level of illumination, for example, level 3 (act 612).

The flowchart of FIG. 6 is exemplary and illustrates light source controller 302, 402 causing light source 106 to emit one of three illumination levels based on a level of illumination detected. However, in other implementations, light source controller 302 may cause light source 106 to emit a level of illumination selected from greater than three levels of illumination or less than three levels of illumination based on the level of ambient or displayed illumination detected.

FIG. 7 is a flowchart that illustrates another implementation of act 504 in an embodiment consistent with the subject matter of this disclosure. In this implementation, light source controller 302, 402 may cause light source 106 to emit a level of illumination from a continuous range of levels rather than a finite number of discrete levels, such as illustrated by the implementation of FIG. 6.

Light source controller 302, 402 may receive the level of detected ambient or displayed illumination from image sensor 102, light sensor 110, or signals 408 from processing device 128 (act 702). Light source controller may then set a level of direct illumination for light source 106 that is proportional to the level of detected ambient or displayed illumination (act 704). For example, suppose the level of illumination may be selected from a continuous scale of 0 through 100, where 0 indicates 0% direct illumination and 100 indicates 100% direct illumination. In one implementation, light source controller 302, 402 may select a level of direct illumination for light source 106 by multiplying a level of detected ambient or displayed illumination by a constant k. For example, assuming that the level of detected ambient or displayed illumination is on a scale of 0 through 100, the level of direct illumination may then be determined by a formula:

$$DI = k \times DetIl,$$

where DI is a level of direct illumination and DetIl is a level of detected ambient or displayed illumination. If DI is greater than 100, DI may be set to 100 to limit DI to a maximum value.

The above formula is only an example of a formula that may be used in one or more implementations. Other formulas may be used in other implementations.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific details, they should not be construed as limiting the claims in any way. Other configurations of the described embodiments are part of the scope of this disclosure. For example, hardwired logic may be used in implementations instead of processors, or one or more application specific integrated circuits (ASICs) may be used in implementations consistent with the principles of the subject matter of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim:

1. A system for dynamically adjusting a level of direct illumination for an imaging system based on a level of illumination, the system comprising:
    a camera sensitive to at least one of infrared light or ultraviolet light;
    an adjustable direct non-visible light source for illuminating an area of interest with non-visible light;
    a light detector configured to detect a level of ambient illumination, the light detector including at least one of the camera or a light sensor, wherein:
    the adjustable direct non-visible light source is configured to be adjusted in response to the detected level of ambient illumination from the light detector,
    the camera is configured to be more sensitive to the at least one of infrared light or ultraviolet light when the adjustable direct non-visible light source is reduced, and
    the camera is configured to be less sensitive to the at least one of infrared light or ultraviolet light when the adjustable direct non-visible light source is increased.

2. The system of claim 1, wherein the light detector is configured to detect the level of ambient illumination in a same frequency range as the non-visible light from the adjustable direct non-visible light source.

3. The system of claim 1, wherein the light detector is configured to detect the level of ambient illumination of non-visible light in a different frequency range as the non-visible light from the adjustable direct non-visible light source.

4. The system of claim 1, wherein the adjustable direct non-visible light source is configured to be extinguished when the light detector is detecting the level of ambient illumination.

5. The system of claim 1, wherein:
the light detector is configured to detect a level of visible ambient illumination.

6. The system of claim 1, wherein the camera is configured to amplify signals in response to the light detector detecting a reduced level of ambient illumination.

7. A method for dynamically adjusting a level of direct illumination for an imaging system based on a level of ambient or displayed illumination, the method comprising:
detecting the level of at least one of ambient or displayed illumination;
altering the level of direct illumination based on the detected level of the at least one of ambient or displayed illumination; and
adjusting operation of an image sensor of the imaging system based on the altered level of direct illumination, wherein the image sensor is sensitive to non-visible light.

8. The method of claim 1, wherein:
the image sensor is sensitive to at least one of infrared light or ultraviolet light,
the direct illumination includes the at least one of infrared light or ultraviolet light, and
detecting the level of the at least one of ambient or displayed illumination comprises detecting the level of ambient illumination.

9. The method of claim 8, wherein detecting the level of ambient illumination comprises:
detecting the level of ambient illumination in a same frequency range as the direct illumination.

10. The method of claim 1, wherein altering the level of direct illumination based on the detected level of the at least one of ambient or displayed illumination further comprises:
altering the level of direct illumination to one of a plurality of discrete illumination levels.

11. The method of claim 1, wherein altering the level of direct illumination based on the detected level of the at least one of ambient or displayed illumination further comprises:
altering the level of direct illumination to a level from a continuous range of illumination levels.

12. The method of claim 1, wherein detecting the level of the at least one of ambient or displayed illumination, further comprises:
using the image sensor to measure a level of ambient illumination.

13. The method of claim 1, wherein detecting the level of the at least one of ambient or displayed illumination, further comprises:
using at least one light sensor to measure the level of ambient illumination.

14. The method of claim 1, wherein detecting the level of the at least one of ambient or displayed illumination comprises:
detecting brightness of a displayed image.

15. The method of claim 1, wherein detecting the level of the at least one of ambient or displayed illumination comprises:
extinguishing direct illumination while measuring the level of the at least one of ambient or displayed illumination.

16. The method of claim 1, wherein adjusting operation of an image sensor of the imaging system based on the altered level of direct illumination further comprises:
performing, in response to a change in the level of direct illumination, at least one of adjusting an amount of time to integrate a camera image, adjusting a camera signal, or programmatically compensating for a resultant camera image.

17. A system for dynamically adjusting a level of direct illumination for an imaging system based on a level of ambient illumination, the system comprising:
a camera sensitive to infrared illumination;
means for detecting a level of infrared ambient illumination;
means for altering a level of direct infrared illumination to one of a plurality of discrete illumination levels; and
means for amplifying camera signals in response to a reduction of the direct non-visible illumination by the means for altering the level of direct non-visible illumination to one of a plurality of discrete illumination levels.

18. The system of claim 17, wherein:
the means for detecting a level of infrared ambient illumination comprises the camera and at least one light sensor.

19. The system of claim 17, wherein the means for detecting a level of infrared ambient illumination comprises:
means for extinguishing a source of the direct infrared illumination when detecting the level of the infrared ambient illumination.

20. The system of claim 17, further comprising at least one of:
means for adjusting an opening of an aperture of the camera; or
means for altering processing of pixels of an image taken by the camera.

* * * * *